United States Patent [19]

Rose

[11] Patent Number: 4,556,921
[45] Date of Patent: Dec. 3, 1985

[54] METHOD AND APPARATUS TO IMPROVE THE POSITIONING ACCURACY OF A TRACKING ARM

[75] Inventor: Andrew M. Rose, Mountain View, Calif.

[73] Assignee: Memorex Corporation, Santa Clara, Calif.

[21] Appl. No.: 509,841

[22] Filed: Jun. 30, 1983

[51] Int. Cl.$^4$ ................... G11B 21/10; G11B 21/08
[52] U.S. Cl. ......................................... 360/77; 360/78
[58] Field of Search ..................... 360/77, 78, 75; 318/620, 651, 317, 367, 444

[56] References Cited

U.S. PATENT DOCUMENTS

| | | | |
|---|---|---|---|
| 3,808,486 | 4/1974 | Cuda et al. | 318/620 |
| 4,030,132 | 6/1977 | Iftikar et al. | 360/77 X |
| 4,072,990 | 2/1978 | Case et al. | 360/78 X |
| 4,135,217 | 1/1979 | Jacques et al. | 360/78 X |
| 4,149,201 | 4/1979 | Card | 360/77 |
| 4,268,785 | 5/1981 | Svendsen | 360/78 X |

Primary Examiner—Raymond F. Cardillo, Jr.
Assistant Examiner—Steven R. Garland
Attorney, Agent, or Firm—Nathan Cass; David W. Heid; Kevin R. Peterson

[57] ABSTRACT

An apparatus to improve the positioning accuracy of an actuator in a disc system. The apparatus provides for accelerating and braking the actuator at appropriate times during positioning operations in order to accurately position the actuator at a selected track on the disc. In addition, in order to maintain positioning accuracy in the presence of run-out, provision is made for detecting the occurrence of run-out by comparing positioning accuracy at spaced time intervals and blocking actuator braking at those times when it would be counter-productive to positioning accuracy.

7 Claims, 9 Drawing Figures

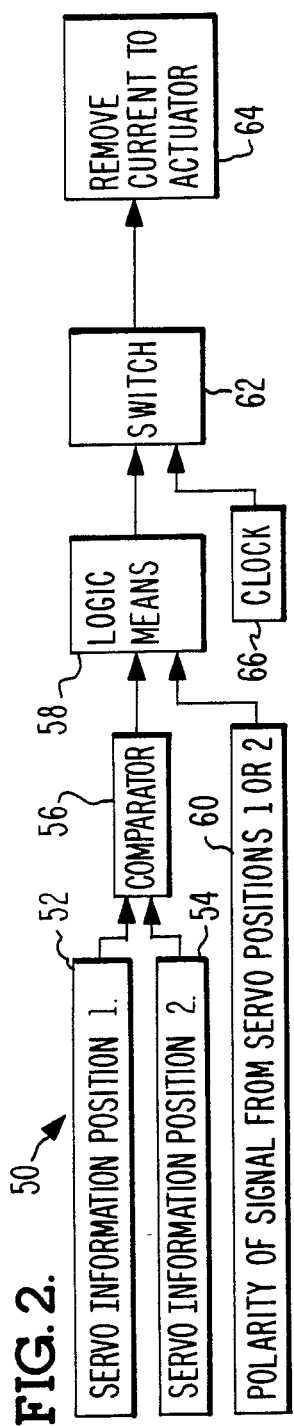
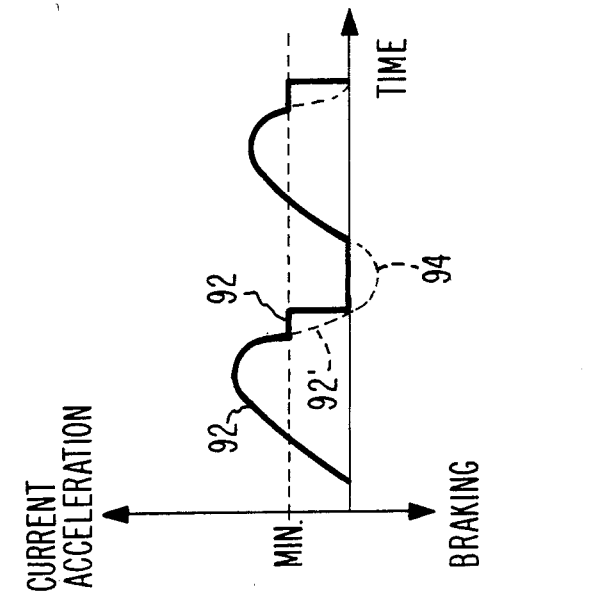
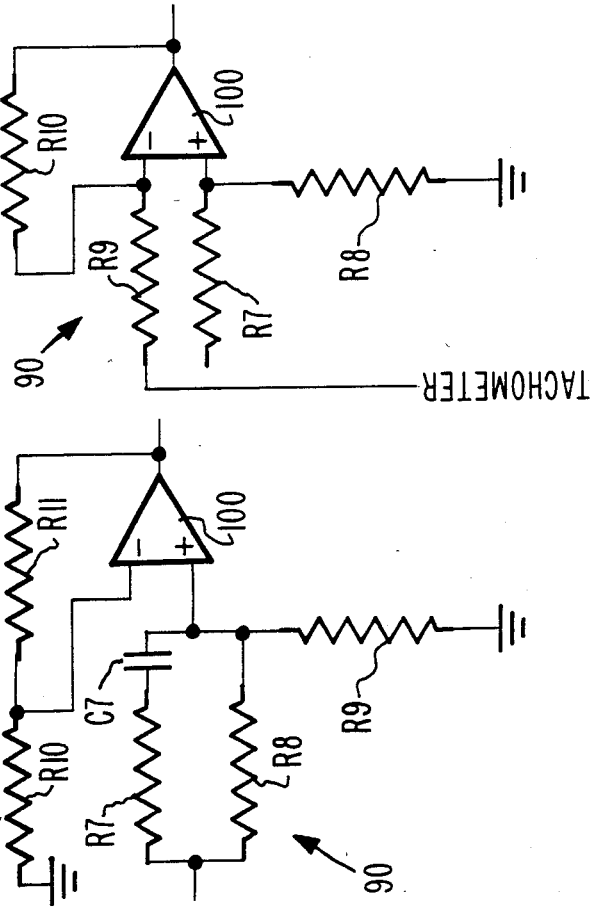

METHOD AND APPARATUS TO IMPROVE THE POSITIONING ACCURACY OF A TRACKING ARM

BACKGROUND OF THE INVENTION

This invention relates to a method and apparatus to improve the positioning accuracy of a tracking arm as it follows a selected position on the surface of a rotating member, and more particularly, this invention relates to a method and apparatus for use wherein the rotating member is subject to the phenomenon of run-out.

In data storage apparatus of the type using rotating disc or a stack of rotating discs as the recording medium, data is usually recorded in a plurality of concentric data tracks on the surface of the disc. The tracks are closely spaced, for example, at 480 tracks per inch, and the data recorded at densities in excess of 9,000 bits per inch. In order to access the recorded data, it is necessary to move a record and playback head (or transducer) to the selected track in which the desired information is stored, and maintain the head precisely over the center of the track with a minimum displacement error in the presence of any possible displacement error for the whole time the information is being read or being written.

As track density increases, it becomes more imperative that the record and playback head, or transducer, be accurately maintained over the selected track in which the desired information is either being read or being written. One factor limiting the accuracy of the tracking position of the transducer over the selected position is the mechanical tolerance in the head positioning motor and the support system. In addition, in some recording discs, which are removable, the abutting surfaces of the disc and the disc drive spindle may cause additional errors. One resultant error from the foregoing mechanical tolerances is the phenomenon of run-out. Run-out is caused by eccentricity of the disc or of the spindle or both. Run-out is the result of the eccentricity or the wobbling of the disc, wherein the center of the disc rotation does not coincide with the center of the data track or of the written material. Run-out may be observed even in common day experience by watching the behavior of a tracking arm in a phonograph record player wherein the arm moves to and fro in a sideways motion as it follows the tracks of a warped phonograph.

One technique taught by the prior act of eliminating run-out is disclosed in U.S. Pat. No. 3,808,486. Since the disc spins at a constant frequency, run-out occurs at the same known constant frequency. In that patent, the amplifier supplying the power to the actuator which moves the tracking arm has a non-linear response, whereby at the run-out frequency, there is an increased amount of gain from the amplifier to the actuator which moves the transducer. In this manner, the patent teaches that the actuator would be moved an additional amount at the run-out frequency in order to be in phase with the run-out to keep accurate tracking over the tracks. Although this is a viable solution to the problem of run-out, the solution taught by the patent is not desirable for a number of reasons. First, the response time of this servo system is slow. Because both the frequency and the gain have a distribution of values, or a sigma, the increase in gain at the run-out frequency is a broad band. Thus the response factor is slow which requires several revolutions of the disc for the gain increase of this technique to build up. Next, since the teaching of that patent is to change the frequency and gain response of the power amplifier that supplies the current to the actuator, the electronic circuitry to implement that teaching is necessarily complicated and is expensive.

SUMMARY OF THE INVENTION

Therefore, in accordance with the present invention whereby a fast response to the problem of run-out is achieved in order to improve the positioning accuracy of a tracking arm to follow a selected position on the surface of a rotating member, the apparatus has acceleration means for moving the arm and braking means for braking the movement of the arm. The apparatus further has means for detecting the run-out and means responsive to the detecting means for removing the braking means in the event of the run-out detected.

The present invention also comprises a method of using the foregoing apparatus.

BRIEF DESCRIPTION OF THE DRAWINGS

FIG. 2 is a schematic block diagram of the apparatus of the present invention.

FIGS. 4(a–b) are circuit diagrams of one element of the apparatus of the present invention shown in FIG. 3.

FIG. 5 is a timing graph illustrating the operation of FIGS. 4a and 4b.

DETAILED DESCRIPTION OF THE DRAWINGS

Figure 1A:
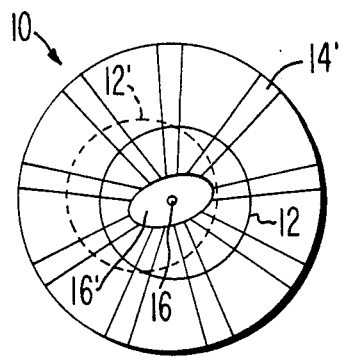
FIGS. 1(a–d) are various diagrams showing the phenomenon of run-out: (a & b) the impact on the actuator or tracking arm; (c) the plot of distance error versus time as a result of run-out; (d) and a portion of the plot shown in FIG. 1(c).
Figure 1B:
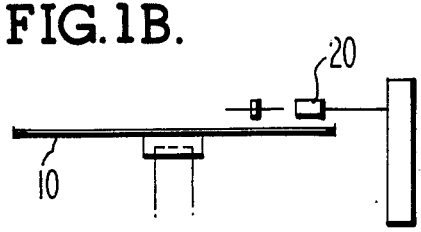
Figure 1C:
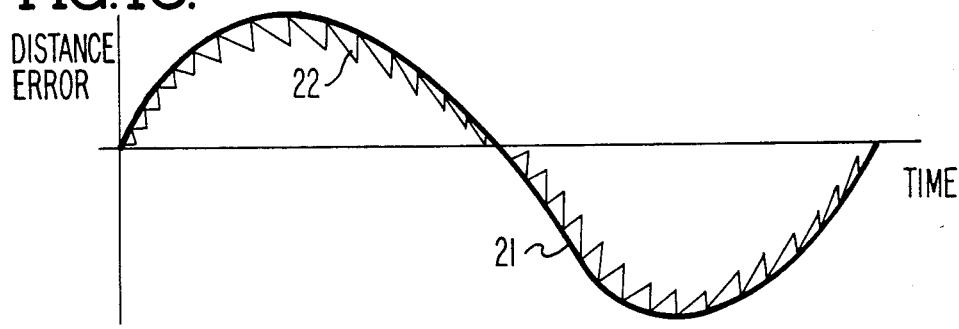

Referring to FIG. 1(a) there is shown a top view of a magnetic disc 10 typically used in disc drives. The magnetic disc 10 has data tracks recorded on it. One such track 12 is shown for illustration purposes. The disc 10 also has sectors 14 wherein servo information is recorded therein. It should be understood that the sectors 14 and the data track 12 are not physically apparent to the naked eye but are shown in FIG. 1(a) solely for illustrative purposes. The tracks 12 are typically concentric and are recorded such that the center of the circle of the tracks 12 coincide with the hole 16, which is the center of rotation of the disc 10. The phenomena of "run-out" occurs when the disc 10 is mounted on the disc drive as shown in FIG. 1(b) and the center of rotation of the disc drive with the disc 10 thereon is not at the hole 16. In fact, for illustration purposes again, the center of rotation is at 16' and one concentric circle around the center rotation 16' is shown by the dashed circle 12'. Thus, the phenomena of run-out, wobbling or precession occurs when a tracking arm 20 attempts to follow a physical concentric circle 12' which does not coincide with the concentric circle 12 in which data is recorded. The tracking arm 20 if allowed to maintain at a fixed distance from the center rotation 16' would follow the concentric circle 12' instead of the track 12 with the data therein. The error induced by maintaining the tracking arm 20 at a fixed distance from the center of rotation 16' is shown in FIG. 1(c). For every revolution of the disc 10, the tracking arm 20 would be accurately in place for only two instances of time during the rotation of the disc 10. At all other times, the tracking arm 20 would have an error in position as shown by the plot of distance error versus time in FIG. 1(c). The actual tracking of the disc 10 by the arm 20 is shown by graph 22. At every location wherein the graph 22 jumps into the curve 21, (such as points 24a, 24b, and 24c), those points denote when the actuator 20 is over the sectors 14 containing the servo information. At those locations the actuator 20 would have the exact actual positioning information from the reading of the servo information recorded in the sectors 14. When the actuator 20 senses the sector information 14, the information is relayed to the servo feedback circuit (not shown) of the disc drive. Such a circuit is well known in the art. The circuit sensing that the actuator 20 is not correctly positioned would send a current to accelerate or to move the actuator 20 in a direction to reduce the error in distance between the location of the actuator 20 and the actual location of the data track 12. This is shown as curve 26. However, a high bandwidth, fast response servo would automatically reverse the current to the actuator 20, inducing a braking current to slow down the actuator 20 so as not to "overshoot" the intended position, as the actuator 20 nears another servo sector 14. This is shown as curve 28. Such application of the braking current 28 is automatically present in the servo circuit of the prior art. Lowering the servo bandwidth would reduce the braking, but would by nature increase the response time and therefore increase the error.

The apparatus of the present invention is intended to improve the positioning accuracy of the actuator 20 as it attempts to follow the data track 12 on the disc 10, wherein the disc 10 has servo information recorded in sectors, and is subject to run-out condition. Furthermore, the actuator 20 is subject to acceleration for moving it and braking means for braking its movement.

Figure 1D:
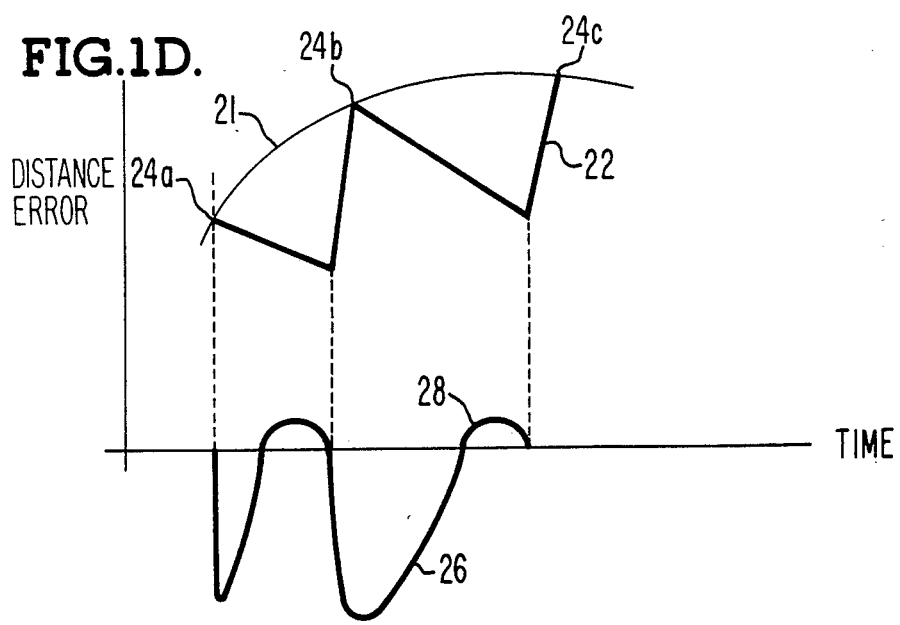

Referring to FIG. 2 there is shown a block diagram form of the apparatus 50 of the present invention. The apparatus 50 comprises a first source 52 for providing servo information from a first sector 14. A second source 54 provides servo information from a second sector 14. The servo informatin from the first source 52 and from the second source 54 are entered into a comparator 56. The output of the comparator 56 is entered into a logic means 58. The polarity of the electrical signal from the servo information from the first souce 52 or the second source 54 is also entered into the logic means 58. The logic means 58, based upon the results of the comparator 56 and the polarity of the signal from the first or second servo source 52 and 54 respectively, determines whether or not to activate the switch 62. When the switch 62 is activated, it removes the current to the actuator 20. The timing of the removal of the current to the actuator 20 is provided by the clock 66, such that when the switch 62 is activated it occurs when the current is a braking current that is applied to the actuator 20. Thus, in FIG. 1(d), the apparatus 50 of the present invention would remove the portion of the graph shown as 28. By removing the braking current to the actuator 20, the apparatus 50 of the present invention serves further to allow the actuator 20 to coast in the direction to reduce the distance error between the actuator 20 and the track 12. Thus, positioning accuracy is increased.

Figure 3:
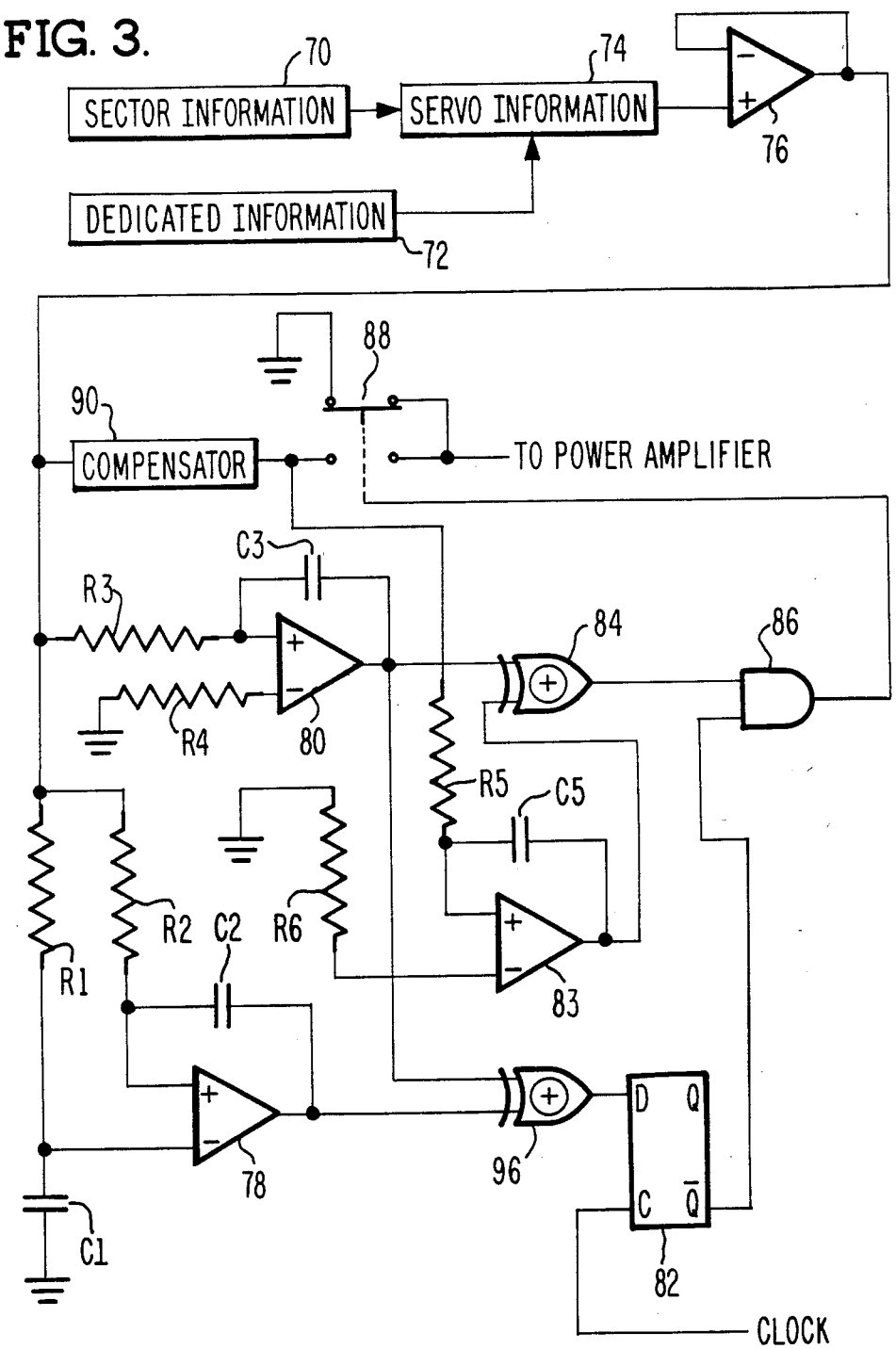
FIG. 3 is a circuit diagram of one embodiment of the apparatus of the present invention.

Referring to FIG. 3 there is shown in detail one embodiment of the apparatus 50 of the present invention shown in circuit diagram form. In the apparatus 50 shown in FIG. 3, the servo information 74 is shown as combined from the sector 14 and from a dedicated disc surface. The use of the combination of servo information from the sector 14 and from the dedicated data disc is disclosed in U.S. Pat. No. 4,072,990. That patent is incorporated by reference herein. Although in the example shown in FIG. 3 the servo information 74 is derived from both the sectors 14 as well as a dedicated disc surface, the apparatus 50 of the present invention may be used with servo information from any source. The input of the servo information 74 to the apparatus 50 is not limited to the information from sector 14 or to the information from the sector 14 in combination with a dedicated disc surface. The servo information 74, from whatever source, is entered into a first operational amplifier 76. The first operational amplifier 76 serves to isolate the source 74 from the rest of the system. The servo information 74 is entered into an $R_3 C_3$ network along with a first comparator 80 which is then entered into a first exclusive OR gate 96. The servo information 74 is also entered into an $R_1 C_1$ and $R_2 C_2$ circuit with a second comparator 78, the output from which is entered into the first exclusive OR gate 96. The network comprising the $R_1 C_1$ and $R_2 C_2$ with the second comparator 78 serves as a delay circuit. Thus at the first exclusive OR gate 96, the input signals therein are the servo information 74 and a delayed servo information 74. In other words, the first exclusive OR gate 96 compares servo information from two different instances of time. Since the disc 10 is rotating, this is in effect comparing the servo information derived from two positions on the disc 10. The output of the first exclusive OR gate 96 is entered into a latch 82. The latch 82 is merely a flip-flop. A clock is gated into the flip-flop 82 and serves to strobe the output of the first exclusive OR gate 96 into the latch 82 at the desired time. From the output of the first comparator 80, the polarity of the electrical signal from the servo information 74 is entered into a second exclusive OR gate 84. The output of the second exclusive OR gate 84 is entered into an AND gate 86. Another input to the AND gate 86 is from the $\overline{Q}$ output of the latch 82. From the AND gate 86 the output is connected to the switch 88 which removes the power to the amplifier which controls the current to the actuator 20. In the configuration shown in FIG. 3, the switch 88 is shown in the switched off position.

The theoretical basis for the apparatus 50 of the present invention may be understood as follows. The apparatus 50 analyzes the servo information from two locations on the disc 10. This may be done, for example, by comparing two servo information that differ in time, which is that shown and described in FIG. 3. The effect of delay in time on a moving body is of course a change in distance. Thus, the apparatus 50 as shown in FIG. 3 compares the servo information from two different physical locations on the disc 10. If the comparison between one location to the other location shows a difference, then this indicates that either the actuator has moved or the disc 10 has moved with respect to the actuator. The result of the comparison from the first exclusive OR gate 96 is to set the latch 82 to indicate that potentially the condition of run-out has occurred. If the later produced signal from the servo information 74 shows the error from the track 12 is smaller than the earlier produced signal from the servo information 74, then this indicates that the actuator 20 is getting closer to the actual data track 12. The first exclusive OR gate 96 compares the later produced electrical signal from the first comparator 80 to the earlier produced signal from the second comparator 78. If run-out has occurred, the result of the first exclusive OR gate 96 would be a negative signal entering into the latch 82. A clock serves to clock in the signal from the first exclusive OR gate 96 after the information from the sector 14 has been read in. If the result of the first exclusive OR gate 96 is a negative signal entering into the latch 82, the Q output of latch 82 would of course be a positive signal which is entered into the AND gate 86. If at this point the braking current is applied then the electrical signal from the output of the second exclusive OR gate 84 is positive going, which is entered into the other input to the AND gate 86. The AND gate 86 with two positive input pulses thereinto would produce a positive pulse activating the switch 88 which would cut off the current to the power amplifier to produce the current to the actuator 20. This serves to remove the braking current to the actuator 20.

In an improvement over the apparatus 50 of the present invention, a compensator 90 is provided between the servo information 74 and the output of the apparatus 50 to the power amplifier. The compensator 90 is shown schematically in two different embodiments in FIGS. 4(a & b). The effect of the compensator 90 is to impart minimum acceleration current to the actuator 20. This is graphically demonstrated in FIG. 5, wherein the acceleration current is shown as curve 92. When the acceleration current decreases and reaches a minimum point as denoted by the level entitled "Min", the acceleration current continues at that minimum level rather than taking on the dashed curve of 92'. When the time to accelerate has ended, the acceleration current drops from the minimum level down to zero. The braking current as shown by curve 94 is of course removed by the apparatus 50 of the present invention. The use of a minimum level acceleration current in the apparatus 50 of the present invention increases the positioning accuracy of the actuator 20.

Referring now to FIGS. 4(a & b), these are well known compensators of conventional design. In FIG. 4a, the compensator 90 is a lead/lag phase compensator. The position signal is entered into the operational amplifier 100 through a $R_7C_7R_8$ network. The $R_7C_7R_8$ network serves to change the position signal to one of rate of change. As the position signal decreases, indicating a reduction in error, the rate of change becomes negative. The other input to the operational amplifier 100 is from the $R_{10}R_{11}$ network, which is a constant. Once the value of $R_{10}R_{11}$ exceeds the output of $R_7C_7R_8$, the output of the operational amplifier changes polarity and current to the power amplifier is maintained at a constant level corresponding to the level "Min" shown in FIG. 5. In FIG. 4b, the compensator 90 is a tachometer type compensator. Again, the compensator is of well known conventional design.

There are many advantages to the method and apparatus of the present invention. Unlike the apparatus taught by U.S. Pat. No. 3,808,486, the method and apparatus of the present invention is fast in response. By removing only the counter-productive braking current, the loop gain and stability of the system is maintained. Finally, by imparting minimum acceleration current, the additional compensation circuit increases the positioning accuracy of the servo network.

What is claimed is:

1. Apparatus for improving the positioning accuracy of an actuator adapted to be positioned at a selected track on a rotating disk having servo information in sectors of said disc wherein said disc is subject to run-out, said apparatus comprising:
   actuator control means for applying actuator current to said actuator in an accelerating or braking direction for positioning said actuator at said selected track;
   first detection means for determining the accuracy of positioning of said actuator relative to said selected track and for also determining whether the difference between said actuator and said selected track is increasing or decreasing;
   second detection means responsive to said first detection means for determining whether run-out is present and for also determining whether said actuator control means would apply current to said actuator in a braking or accelerating direction in an attempt to position said actuator at said selected track; and
   actuator current blocking means responsive to said second detection means for blocking the flow of actuator current to said actuator when run-out is present and said actuator current is in a braking direction.

2. The apparatus of claim 1, wherein said first detection means includes means for producing first and second electrical signals indicative of the positioning accuracy of said actuator at two different circumferentially spaced locations of said disc, and means for comparing said first and second signals.

3. The apparatus of claim 2, wherein said actuator current blocking means includes switching means provided in the current flow path of said actuator, said switching means being responsive to said first and said second signals.

4. The apparatus of claim 2, including compensation means operating such that when actuator current is applied to said actuator in an accelerating direction it is caused to be applied at no lower than a predetermined minimum level greater than zero.

5. The aparatus of claim 1, wherein said detection means includes means for comparing detected servo information from two different instances of time as the disc rotates.

6. A method of improving the accuracy of an actuator in positioning an actuator to a selected position on the surface of a rotating disc, wherein said disc may be subject to run-out, the method comprising:
   applying actuator current to said actuator in an accelerating or braking direction for positioning said actuator on said disc;
   detecting the accuracy of positioning of said actuator relative to a selected position thereon at spaced time intervals;
   detecting whether the difference between the position of said actuator and said selected position is increasing or decreasing;
   detecting in response to the foregoing steps of detecting whether run-out is present; and
   blocking the applying of actuator current in a braking direction whenever as a result of run-out it would be counter-productive to obtaining accurate actuator positioning.

7. The method of claim 6, including the step of causing actuator current applied in an accelerating direction to said actuator to be applied at no lower than a predetermined minimum level greater than zero.

* * * * *